United States Patent [19]

Jacob et al.

[11] Patent Number: 5,325,222
[45] Date of Patent: Jun. 28, 1994

[54] PHOTONIC CONCENTRATOR

[75] Inventors: Jean-Baptiste Jacob, Perros-Guirec; Guy Le Roy, Lannion; Jean-Michel Gabriagues, Le Val Saint-Germain, all of France

[73] Assignee: Alcatel Cit, Paris, France

[21] Appl. No.: 826,964

[22] Filed: Jan. 28, 1992

[30] Foreign Application Priority Data

Jan. 29, 1991 [FR] France .................. 91 00980

[51] Int. Cl.$^5$ ............................. H04J 14/00
[52] U.S. Cl. ............... 359/123; 359/140; 359/158; 370/50
[58] Field of Search ........... 359/117, 123, 128, 139, 359/140, 158; 370/60, 50, 91, 100.1, 94.1, 91, 94.2

[56] References Cited

U.S. PATENT DOCUMENTS 5,105,292  4/1992  Le Roy .................. 359/123

FOREIGN PATENT DOCUMENTS 0197263 10/1986  European Pat. Off. ........... 359/123
0282071  9/1988  European Pat. Off. .
0351729  1/1990  European Pat. Off. .
0051834  2/1989  Japan ......................... 359/123
2224620  5/1990  United Kingdom ............. 359/123

OTHER PUBLICATIONS

IEEE Journal on Selected Areas in Communications, vol. 6, No. 7, Aug. 1988, pp. 1096–1106, New York, US; R. A. Thompson: "Architectures with improved signal-to-noise ratio in photonic systems with fiber-loop delay lines".
Patent Abstracts of Japan, vol. 10, No. 228 (E-426)[2284], Aug. 8, 1986; & JP-A-61 61 596 (NTT) Mar. 29, 1986.

Primary Examiner—Weslie Pascal
Attorney, Agent, or Firm—Sughrue, Mion, Zinn, Macpeak & Seas

[57] ABSTRACT

A photonic concentrator is used to connect to a telecommunication network subscriber terminals sending and receiving data in the form of fixed length cells using asynchronous time-division multiplexing, in particular on an optical fiber. The concentrator comprises, for processing cells from a subscriber terminal, a time-division and non-synchronous statistical spectral multiplexing stage, a synchronization to a local clock stage, a spectral multiplexing and bit rate converter stage, and a periodic time-division multiplexing stage. To process cells addressed to subscriber terminals it comprises a periodic time-division demultiplexing, spectral multiplexing and bit rate adjuster stage, a bit rate converter stage and a spectral demultiplexing stage. The concentrator has applications in telecommunication networks.

4 Claims, 10 Drawing Sheets

SPECTRAL MULTIPLEXER/BIT RATE CONVERTER

PHOTONIC CONCENTRATOR

BACKGROUND OF THE INVENTION

1. Field of the invention

The invention concerns a photonic concentrator for connecting subscriber terminals to a telecommunication network using asynchronous time-division multiplexing. This type of multiplexing enables all kinds of information to be transmitted in a single form comprising packets of bits of fixed length called cells. It is known to connect subscriber terminals to a telecommunication network using concentrators whose function is to concentrate calls from relatively lightly loaded subscriber circuits onto more heavily loaded multiplexes. Conversely, a concentrator takes calls from a heavily loaded multiplex and transfers them onto a line connected to a subscriber terminal which is relatively lightly loaded.

2. Description of the prior art

French patent application No 2 646 036 describes an all electronic digital subscriber access unit comprising a plurality of concentrators for connecting subscriber terminals using various transmission techniques, including asynchronous time-division multiplexing, to a telecommunication network. In these known type concentrators, each concentrator comprises subscriber access circuits and two concentrator stages.

Each subscriber access circuit provides functions including:

optical-electronic conversion and vice versa for each subscriber terminal connected to the concentrator by an optical fiber line;

delineation of the cells received from the subscriber terminal, by which is meant the identification of the start of each cell;

descrambling of the data field of each cell received from a subscriber terminal;

scrambling of the data field of each cell sent by the concentrator to a subscriber terminal;

calculation of the error detection word relating to the header of each cell sent from the concentrator to a subscriber terminal or received from a subscriber terminal;

resynchronization of the cells sent by a subscriber terminal to a local clock of the subscriber access unit;

a policing function which monitors the output bit rates of the subscriber terminals;

extracting signalling cells from the cells sent by a subscriber terminal and injecting signalling cells into the cells sent by the concentrator to a subscriber terminal;

conversion of the virtual circuit and virtual circuit group labels included in each cell sent by a subscriber terminal;

calculation of the routing label for routing each cell in the switching network and insertion of this label in front of the cell header;

elimination of empty cells sent by a subscriber terminal; and insertion of empty cells into the cells sent from the concentrator to the subscriber terminals.

The first stage of concentration comprises an asynchronous time-division switching matrix controlled by a microprocessor. The second stage of concentration comprises another asynchronous time-division switching matrix or a time-division multiplexer-demultiplexer controlled by a microprocessor.

The design of this concentrator is optimized for use of electronic components but is not optimized for use of photonic components. These have the advantage of a higher speed and enable spectral multiplexing. Retaining the design of known type concentrators would result in underuse of the performance capabilities of photonic technology.

An object of the invention is to propose a photonic concentrator whose design is not merely deduced from that of a known electronic concentrator but which is optimized for the use of photonic components.

SUMMARY OF THE INVENTION

The invention consists in a photonic concentrator for connecting to a telecommunication network subscriber terminals sending and receiving data in the form of fixed length cells using asynchronous time-division multiplexing wherein to process cells from subscriber terminals it comprises means for time-division multiplexing and spectral multiplexing cells from subscriber terminals and means for synchronizing to a local clock cells multiplexed by the time-division and spectral multiplexing means.

This photonic concentrator is particularly simple to implement because the spectral multiplexing carried out by the means for spectrally multiplexing the cells from the subscriber terminals makes it possible to divide by 16, for example, the number of devices for synchronizing cells to a local clock.

To process cells from subscriber terminals the concentrator preferably further comprises:

means for spectrally multiplexing the resynchronized cells and for multiplying their bit rate; and means for time-division multiplexing without spectral multiplexing cells output by the spectral multiplexing and bit rate multiplier means.

This concentrator can be connected to a telecommunication network by standard asynchronous time-division multiplexes using means for multiplying the bit rate and means for time-division multiplexing with no spectral multiplexing. Also, this concentrator is compatible with any local central office using the asynchronous transfer mode technique, whether implemented in electronic or photonic technology.

To process cells addressed to subscriber terminals the concentrator preferably comprises:

means for time-division demultiplexing and spectrally multiplexing said cells;

means for dividing the bit rate of the time-division demultiplexed and spectrally multiplexed cells; and means for spectrally demultiplexing cells whose bit rate has been divided.

This photonic concentrator is particularly simple to implement because the means for dividing the bit rate may be shared by a plurality of subscriber terminals because they process cells which are spectrally multiplexed using 16 different wavelengths, for example.

The means for time-division demultiplexing and spectrally multiplexing cells to subscriber terminals preferably operate periodically, the cells supplied to said concentrator by a telecommunication network having been sorted into a given order before they are supplied to said concentrator.

This photonic concentrator is particularly simple to implement because it requires no stage for modifying the order of the cells on the input side of the time-division demultiplexing and spectral multiplexing means operating on the cells supplied by the telecommunication network. Also, this modification to the order makes it possible to simplify significantly the time-division multiplexing as this can be carried out periodically.

The invention will be better understood and other details will emerge from the following description of one embodiment and the appended drawings.

DETAILED DESCRIPTION OF THE INVENTION

Figure 1:
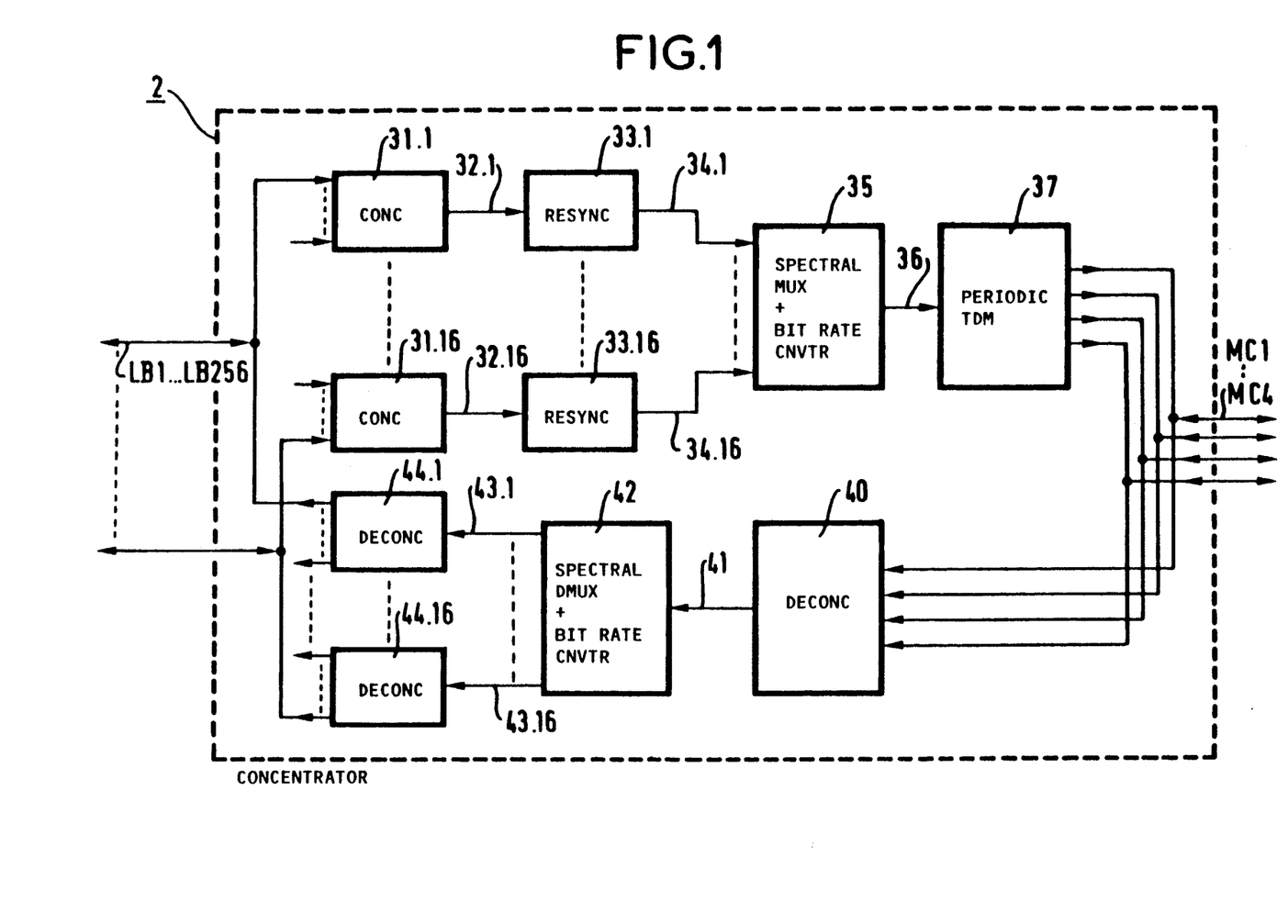
FIG. 1 shows the block diagram of one embodiment of a photonic concentrator in accordance with the invention.

FIG. 1 shows the block diagram of one embodiment of a concentrator 2 in accordance with the invention. It comprises two series of stages in parallel respectively processing cells from and cells to the subscriber access circuits. The cells from 256 subscriber access circuits arriving over the 256 lines LB1 through LB256 are first processed by a stage 31 comprising 16 modules 31.1 through 31.16 in parallel. Each of these 16 modules has 16 inputs connected to 16 of the lines LB1 through LB256. Take the module 31.1, for example. For 16 lines LB1 through LB16 it effects concentration by means of non-synchronous statistical spectral and time-division multiplexing. The module 31.1 supplies on a single optical fiber 32.1 at a bit rate of 622 Mb/s cells encoded by 16 different wavelengths (colors).

These cells are then processed by a stage 33 which resynchronizes them to a local clock of the subscriber access unit. The stage 33 comprises 16 modules 33.1 through 33.16 in parallel. Each of these 16 modules has an input connected to a respective output of a module 31.1 through 31.16. For example, the module 33.1 resynchronizes cells supplied by the module 31.1 over the optical fiber 32.1. From the output of the module 33.1 an optical fiber 34.1 conveys the resynchronized cells to a spectral multiplexing and bit rate converter stage 35. The stage 35 has 16 inputs respectively connected to the outputs of 16 modules 33.1 through 33.16 by 16 optical fibers 34.1 through 34.16. At each input it receives cells that can take 16 colors at a bit rate of 622 Mb/s and it restores at a single output cells of 16 colors at 2.6 Gb/s. An optical fiber 36 conveys these cells to a periodic time-division multiplexing stage 37 to divide the cells between four multiplexes MC1 through MC4 at a bit rate of 2.6 Gb/s and with a load of 0.4 Erlang.

The cells are spectrally multiplexed in the stage 31 to divide by 16 the number of modules of the resynchronization stage 33. The cells reconstituted by the stage 33 are spectrally remultiplexed by the stage 35 to impart 16 different colors to the respective 16 cells received on the 16 inputs of the stage 35. Because of this spectral remultiplexing it is possible to use a single module in stage 35 to process cells from 16 modules of the stage 33 representing 256 subscriber terminals.

On the other hand, this spectral multiplexing cannot be retained in later parts of the system. This is why there is provided a stage 37 which substitutes for spectral multiplexing of 16 colors on the optical fiber 36 periodic time-division multiplexing on four optical fibers. The cells sent on these four fibers representing the multiplexes MC1, ..., MC4 can be any color; these colors are no longer indicative of spectral multiplexing.

Cells from a telecommunication network (not shown) and addressed to 256 subscriber terminals are supplied to a stage 40 by the multiplexes MC1 through MC4. The order of these cells has been changed by the network so that they can be time-division demultiplexed by simple periodic time-division multiplexing. The stage 40 effects a first degree of deconcentration by means of periodic time-division demultiplexing and carries out spectral multiplexing to simplify the stages on its output side.

The cells arriving from the network can be any color. The stage 40 groups them onto a single fiber 41 assigning them 16 different colors. The bit rate of 2.6 Gb/s is retained and as a result each packet of 16 different color cells is followed by a gap whose duration is equal to three cell periods.

A stage 42 then changes the bit rate from 2.6 Gb/s to 657 Mb/s and applies a first degree of spectral demultiplexing. 16 optical fibers 43.1 through 43.16 convey to a stage 44 the cells supplied by the stage 42 and which are spectrally multiplexed using 16 different colors at 657 Mb/s. The stage 44 comprises 16 modules 44.1 through 44.16 in parallel. Each module effects a second stage of deconcentration by a second stage of spectral demultiplexing. Each module supplies cells to 16 lines chosen from the 256 lines LB1 through LB256. It adjusts the bit rate to 622 Mb/s by eliminating the 24 routing label bits associated with each cell, which are of no further utility beyond this stage 44.

It is seen that each resynchronization module 33.1, ..., 33.16 is on the output side of a spectral and time-division multiplexer module 31.1, ..., 31.16, which provides a first level of concentration representing 16 subscriber terminals. Consequently, a concentrator in accordance with the invention requires 16 times fewer resynchronization modules 33.1 through 33.16 than a known type concentrator.

Because spectral multiplexing is used the bit rate converter stage 35 is common to 16 modules 32.1 through 32.16 representing 256 subscriber terminals. Consequently, a concentrator in accordance with the invention requires 256 times fewer bit rate converter devices than a known type concentrator.

Thanks to the spectral multiplexing carried out by the stage 40 on the input side of the bit rate converter stage 42, the latter is common to 256 subscriber terminals. On the other hand, it would have to be duplicated 16 times if there were no spectral multiplexing.

By virtue of the spectral multiplexing function which remains up to stage 44, the bit rate conversion function is implemented in each module 44.1 through 44.16 for 16 subscriber terminals.

Figure 2:
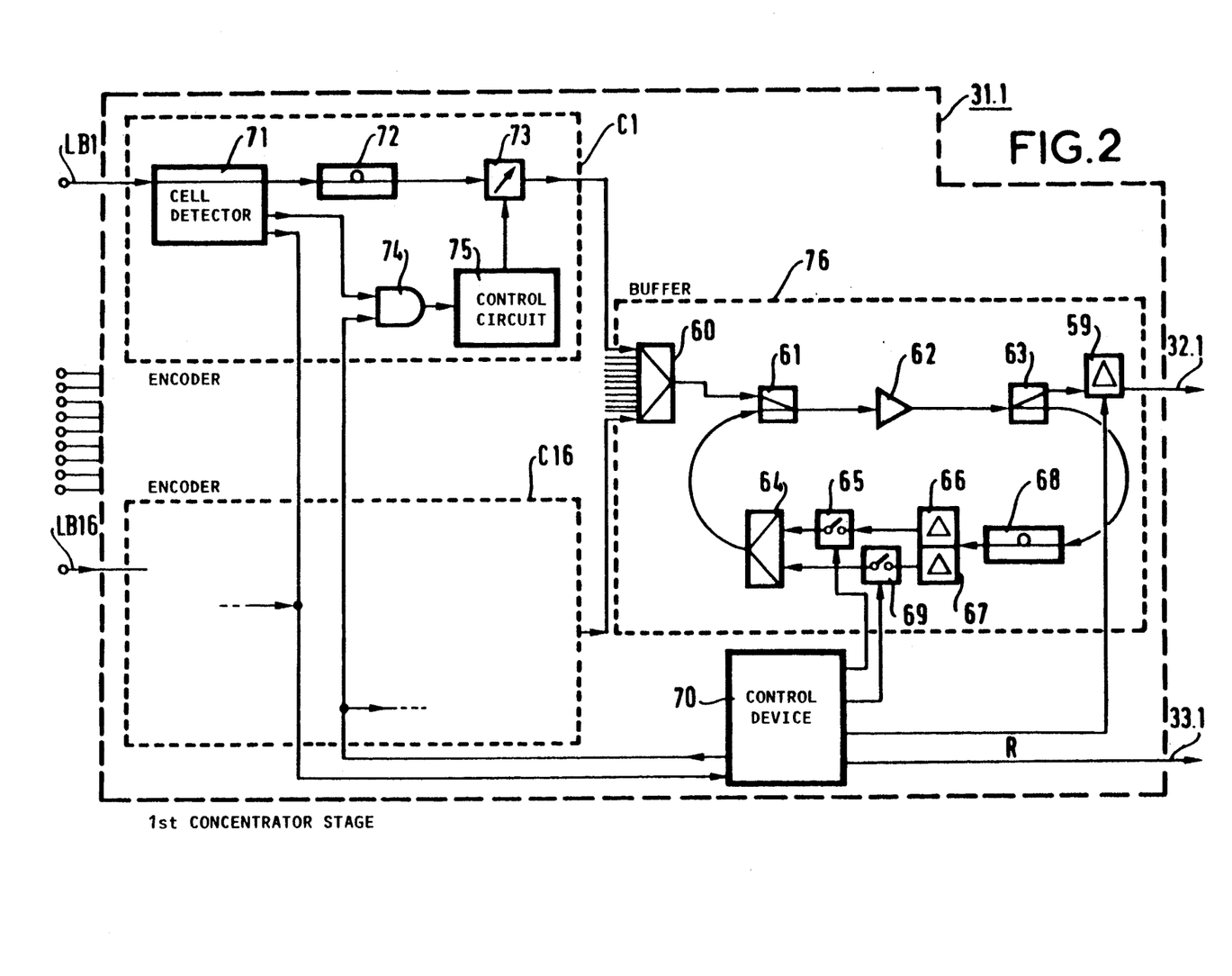
FIG. 2 shows the block diagram of one embodiment of a stage included in the concentrator which effects a first level of concentration by non-synchronous statistical spectral and time-division multiplexing.

FIG. 2 shows the more detailed block diagram of one embodiment of the module 31.1 from the stage 31 of the concentrator 2 which effects a first concentration of the cells from the subscriber terminals by means of non-synchronous statistical spectral and time-division multiplexing. This module 31.1 comprises a first part consisting of 16 encoders C1 through C16 each used to encode a cell using a different wavelength chosen from 16 wavelengths, a second part comprising a buffer 76 for writing and reading 16 cells encoded using the 16 previously mentioned wavelengths and an electronic control device 70 including a local clock.

An input of each encoder C1 through C16 is connected to a respective line LB1 through LB16. An output of each encoder is connected to an input of the buffer 76.

The buffer 76 comprises:
an electrically controlled filter 59;
a combiner 60 having 16 inputs constituting the inputs of the buffer 76;
two three-port couplers 61 and 63;
an optical amplifier 62;
a two-input combiner 64;
two electrically controlled optical gates 65 and 69;
two periodic filters 66 and 67; and
an optical delay line 68 introducing a time-delay equal to the duration of a cell at 622 Mb/s.

An output of the combiner 60 is connected to a first port of a coupler 61. A second port of the coupler 61 is connected to an input of the optical amplifier 62. An output of the latter is connected to a first port of the coupler 63. A second port of the latter constitutes the output of the buffer 76 and is connected to an input of the filter 59. The output of the filter 59 constitutes the output of the memory 76 and of the module 31.1.

A third port of the coupler 63 is connected to a first end of the delay line 68. A second end of the delay line 68 is connected to two filters 66, 67 in parallel. Each of these two filters covers a band of wavelengths comprising eight of the wavelengths used to encode the cells. These filters can therefore eliminate these 16 wavelengths, in groups of eight. The filter 66 is connected to the optical gate 65. The filter 67 is connected to the gate 69. The outputs of the gates 65 and 69 are connected to the inputs of the combiner 64. An output of the latter is connected to the third port of the coupler 61.

An electronic control device 70 has two outputs connected to respective control inputs of the gates 65 and 69, an output connected to a common control input of each of the encoders C1 through C16, an output connected to the module 33.1 and an input receiving cell detection signals supplied by an output common to the 16 encoders C1 through C16.

Each encoder, for example the encoder C1, comprises:

a cell detector device 71 comprising an optical part (not shown) through which passes the optical signal conveying the cells and an electronic part (not shown) capable of recognizing the start of a cell;

a delay line 72 delaying the optical signal from the device 71 to give the electronic part of the device 71 and the device 70 time to carry out their calculations;

a wavelength converter 73 having an input receiving an optical signal supplied by an output of the delay line 72, an electrical control input and an output constituting the output of the encoder and supplying an optical signal to the combiner 60;

an electronic AND gate 74; and an electronic control circuit 75 which supplies the control signal for the wavelength converter 73.

The AND gate 74 has a first input which constitutes the control input of the encoder and receives a control signal supplied by the device 70 to determine the wavelength of the signal leaving the encoder, a second input connected to an output of the cell detector device 71 which supplies a signal to enable this gate and an output connected to an input of the electronic control circuit 75. The electronic part of the device 71 has an output which supplies a cell detection signal at the common output of the encoders connected to the input of the control device 70.

When the device 71 detects a cell the control device 70 chooses the wavelength with which the cell will be encoded and sends a message to the common input of the encoders C1 through C16. This message is sent in the coder which has received the cell, the AND gate 74 being enabled in this encoder by the cell detector device 71 and the counterpart gates being disabled in the other encoders. The cell encoded in this way by one color is stored in the buffer 76.

The device 70 measures the phase difference between the start of each cell and the local clock. It determines the value R of the time-delay to be applied to each cell in order to resynchronize it with the local clock and then sends this value to the module 33.1 immediately before sending it the relevant cell.

The buffer 76 operates as follows: it comprises a loop that can store up to 16 cells of 16 different colors. The amplifier 62 regenerates an optical signal each time that it has completed one cycle in the buffer 76. The time-delay introduced by the delay line 76 represents one cell. Reading one cell of the 16 cells stored in the buffer is carried out by filtering in the filter 59 so as to read only one cell at a time. The buffer 76 is erased one half at a time, by erasing eight cells encoded on eight wavelengths while eight other cells are being written on eight other wavelengths. The optical gates 65 and 69 are alternately opened and closed by the device 70 to carry out this "half and half" writing and erasing.

At this stage the cells from 16 subscriber terminals are concentrated onto the single optical fiber 32.1 by spectral multiplexing on 16 wavelengths but they are not synchronized to the local clock.

Figure 3:
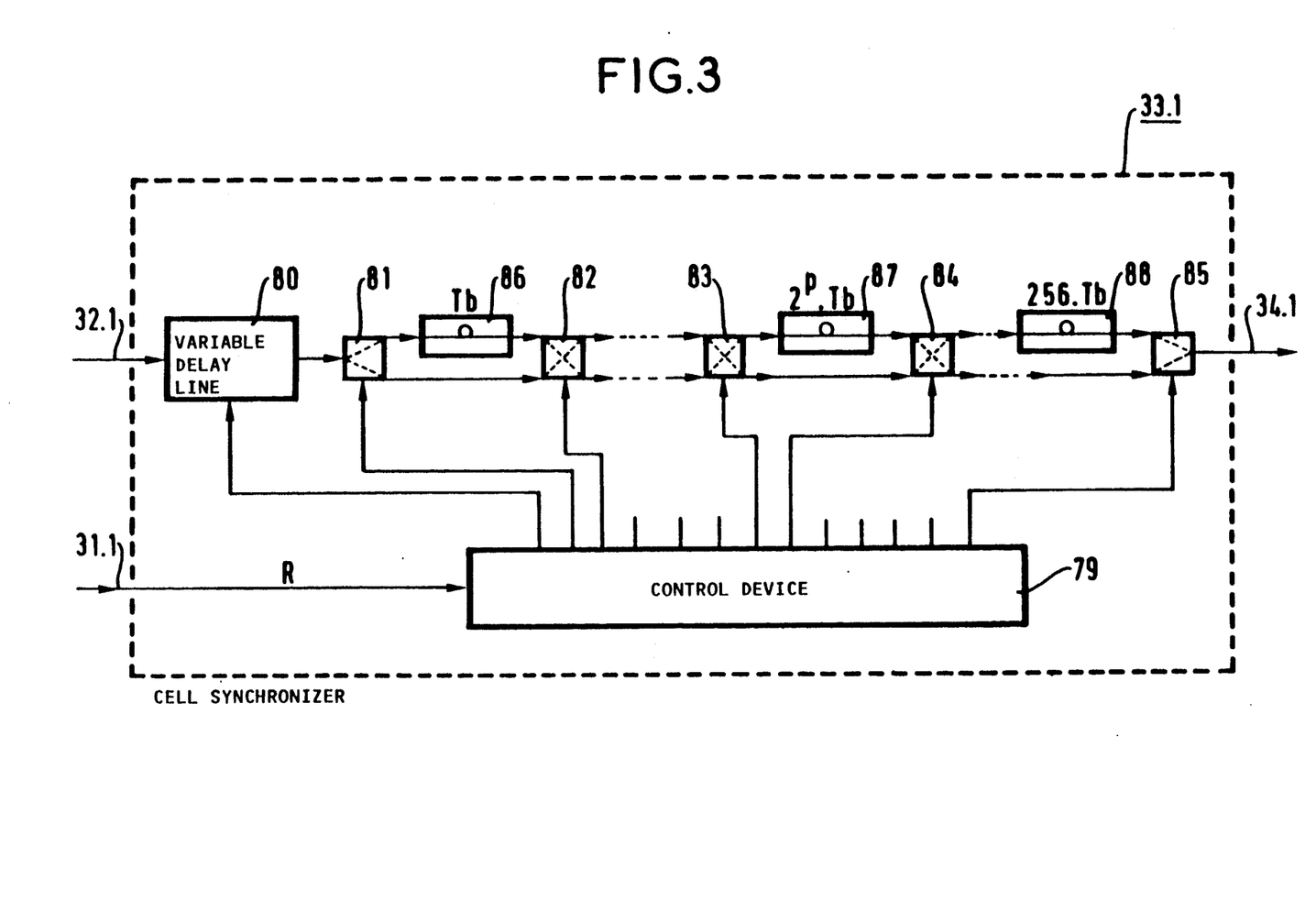
FIG. 3 shows the block diagram of one embodiment of a stage included in the concentrator which resynchronizes the cells relative to a local clock.

FIG. 3 shows the more detailed block diagram of the module 33.1 from the stage 33 of the concentrator 2 for synchronizing cells relative to the local clock. This module 33.1 processes the cells one by one. It comprises:

a variable delay line 80 that is adapted to introduce a time-delay between 0 and Tb where Tb is the bit period;

two three-port electrically controlled couplers 81 and 85 adapted to route a signal supplied to an input to a chosen one of two outputs;

nine fixed delay lines 86, ..., 87, ..., 88 introducing time-delays equal to Tb, ..., $2^p$.Tb, ..., 256.Tb, where p varies from 0 through 8;

eight four-port electrically controlled couplers 82, ..., 83, 84 adapted to route a signal supplied to either of two inputs to a chosen one of two outputs; and a control device 79 connected to the control device 70 of the module 31.1 to receive the value R of the time-delay to be applied to each cell.

The fiber 32.1 is connected to an input of the delay line 80. An output of the line 80 is connected to an input of the coupler 81. The coupler 81 sends the cells from the delay line 80 either to a first input of the coupler 82 via the delay line 86 or directly to a second input of the coupler 82. The latter sends the cells either to its first output or to its second output. When the cells reach the coupler 83 it sends them either to the first input of the coupler 84 via the delay line 87 or directly to the second input of the coupler 84. The cells are sent in this way stage by stage to the coupler 85 which has only three ports, a first input connected to the output of the delay line 88, a second input connected directly to another coupler on its input side and an output constituting the output of the stage 33 connected to the optical fiber 34.1. The variable delay line 80 and the couplers 81 through 85 have control inputs connected to respective outputs of the control device 79.

Each cell comprises 424 bits at this stage. It is necessary to be able to delay all the bits of a cell by an amount variable between 0 and 424.Tb. As the number 424 is between the numbers 256 and 512, the stage 33 . comprises nine fixed delay lines of value Tb, 2.Tb, 4.Tb, 8.Tb, 16.Tb, 32.Tb, 64.Tb, 128.Tb, 256.Tb enabling all time-delay values between Tb and 512.Tb to be obtained by the series combination of some delay lines and short-circuiting the remainder by means of the couplers 82, 83, ..., 84 electrically controlled by the device 79. The variable delay line 80 provides more refined synchronization. The cells outgoing on the fiber 34.1 are therefore synchronized to the local clock cell period.

Figure 4:
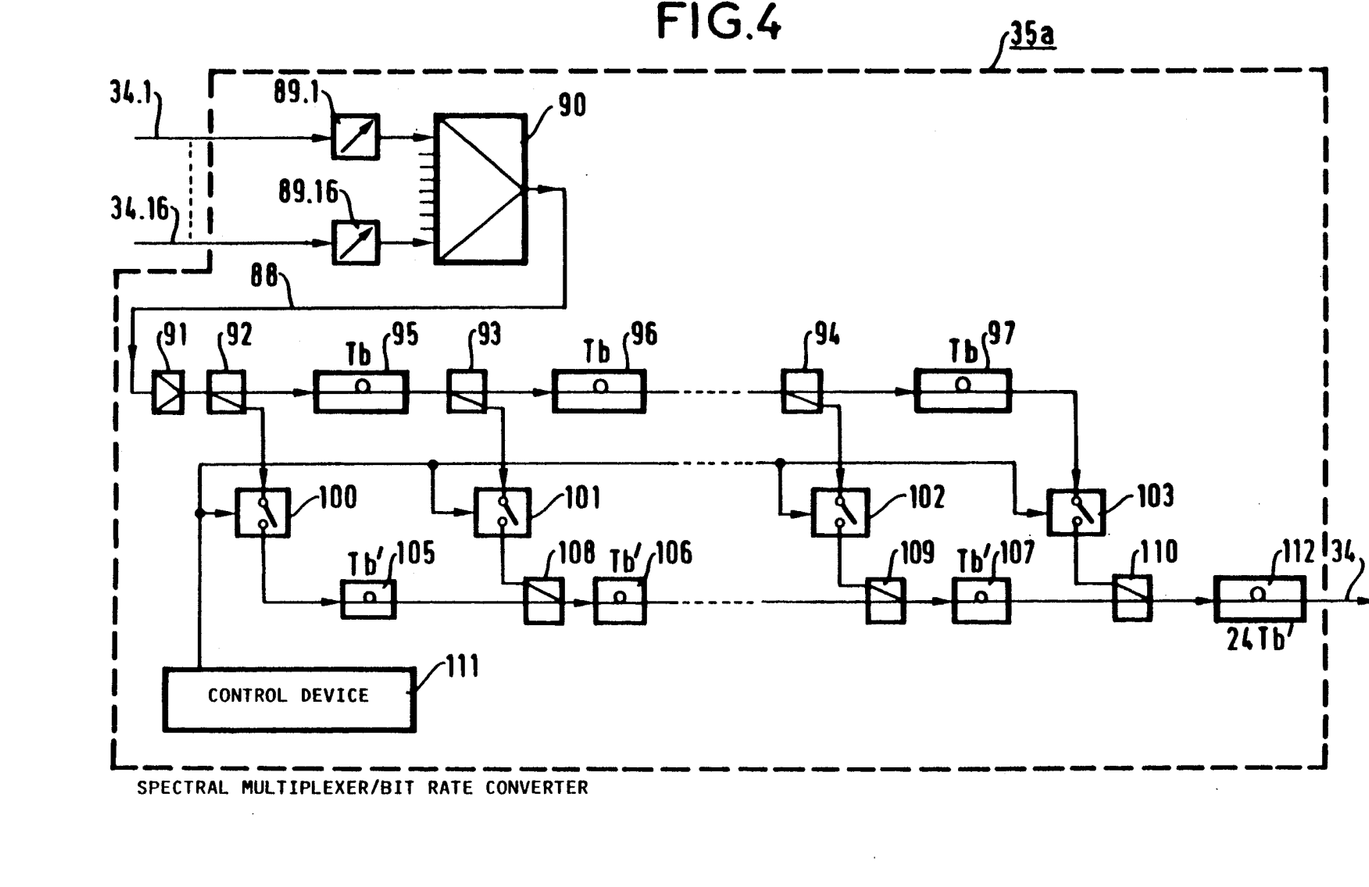
FIGS. 4 and 5 show the block diagrams of two embodiments of a stage included in the concentrator which multiplies the bit rate of cells from subscriber terminals.

FIG. 4 shows the block diagram of a first embodiment 35a of the spectral multiplexing and bit rate converter stage 35 which operates cell by cell to increase the bit rate from 622 Mb/s to 2.6 Gb/s. It processes 16 cells simultaneously because the 16 modules of stage 33 supply it simultaneously with 16 cells encoded by 16 colors which are not necessarily different. For this reason its first function is to apply spectral multiplexing on 16 different colors.

This embodiment comprises:

16 wavelength converters 89.1 through 89.16 having 16 inputs respectively connected to the 16 fibers 34.1 through 34.16 to assign 16 different colors to the 16 cells supplied by the modules 33.1 through 33.16;

a combiner 90 with 16 inputs respectively connected to the 16 outputs of the converters 89.1 through 89.16;

an optical amplifier 91;

a first set of 424 delay lines 95, 96, ..., 97 each introducing a time-delay equal to the bit period Tb at 622 Mb/s;

a second set of 424 delay lines 105, 106, ..., 107 each introducing a time-delay equal to the bit period T'b at 2.6 Gb/s;

424 three-port couplers 92, 93, ..., 94 interleaved between the delay lines of the first set;

424 three-port couplers 108, ..., 109, 110 interleaved between the delay lines of the second set;

424 optical ports 100, 101, ..., 102, 103;

a control device 111 controlling in parallel all the optical gates 100, ..., 103; and a delay line 112 introducing a time-delay equal to 24.Tb'.

The output of the combiner 90 is connected to the input of the amplifier 91. The output of the latter is connected to the first set of delay lines through the coupler 92. A first output of each of the couplers 92 through 94 is connected to a respective input of the gates 100, ..., 102. The output of the delay line 97 is connected to an input of the gate 103. An output of each of the gates 101, ..., 102 is respectively connected to an input of one of the couplers 108, ..., 109. An output of the gate 100 is connected to an input of the delay line 105.

The set of delay lines 95 through 97 constitutes a first shift register with parallel outputs. The second set of delay lines 105 through 107 constitutes a second shift register having parallel inputs. The gates 100, ..., 103 enable the content of the first register to be transferred to the second register. In the first register the bits of the cell are separated by time intervals Tb relating to the bit rate of 622 Mb/s. When a complete cell is present in the first register its bits are transferred simultaneously into the second register. The bits of this cell are separated in the second register by a time interval T'b relating to the bit rate of 2.6 Gb/s. The cell is then a 2.6 Gb/s cell and is supplied to the delay line 112 from the output of the coupler 110. The delay line 112 creates a gap at the start of each cell for the later insertion of 24 routing bits, used to route each cell through the switch stages. Each cell then becomes a 448-bit cell. The cells supplied by the stage 35a are in the form of packets of 16 synchronous cells of 16 different colors. Two consecutive packets are separated by a time interval approximately equal to three times the duration of a packet as the bit rate has been multiplied by approximately four.

Figure 5:
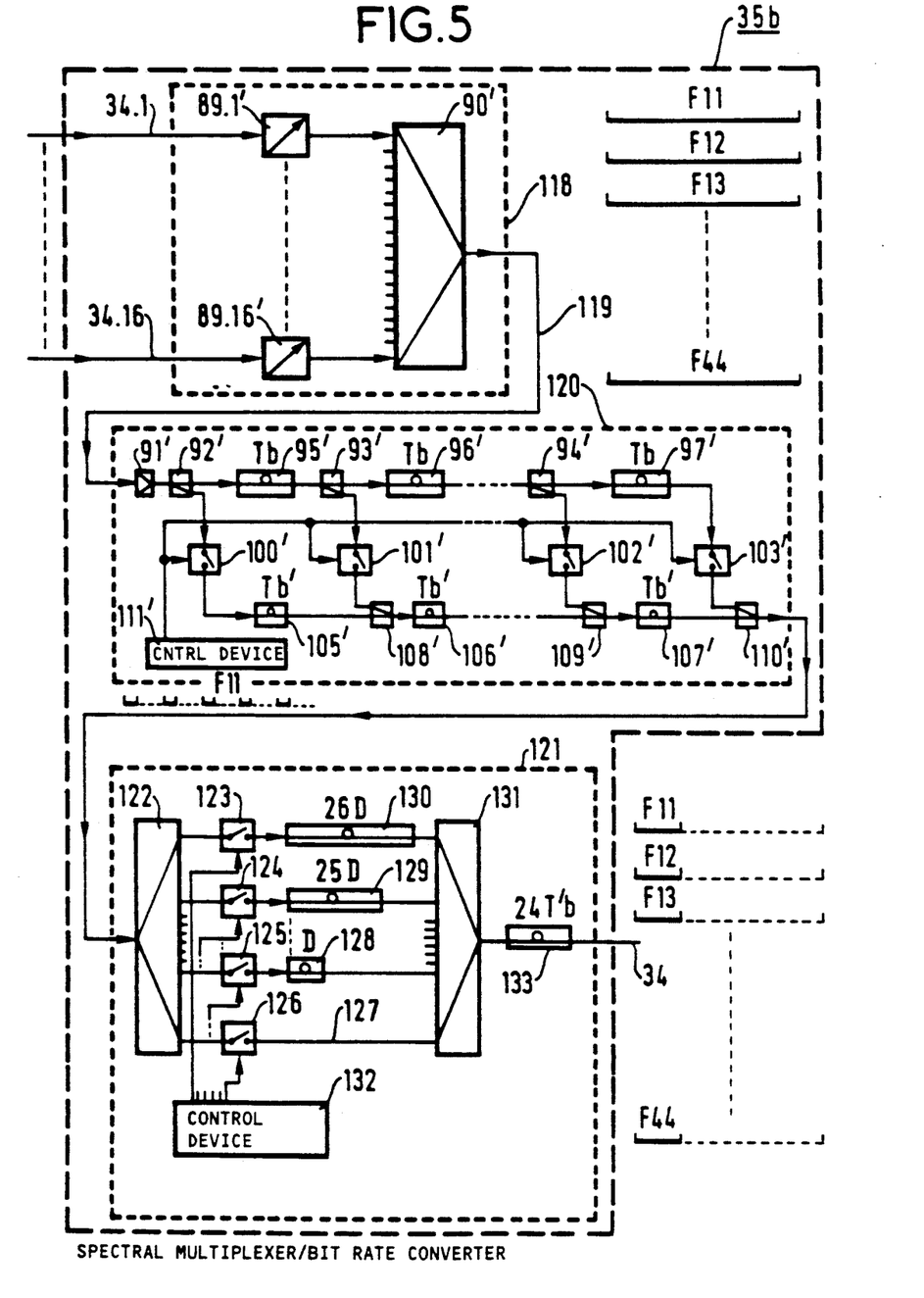

FIG. 5 shows the block diagram of a second embodiment 35b of the spectral multiplexing and bit rate conversion stage. This embodiment operates on blocks of 16 bits instead of on cells on 424 bits, which significantly reduces the number of components needed to implement this bit rate converter stage. Each cell of 424 bits is divided into 28 blocks of 16 bits, the 28 block being empty and the 27th block containing. only eight wanted bits. The stage 35b comprises a part 118 which carries out spectral multiplexing, a part 120 which carries out the bit rate conversion on blocks of 16 bits and a part 121 which concatenates the blocks of 16 bits after the bit rate conversion. The stage 35b processes 16 blocks of 16 different colors simultaneously, executing spectral multiplexing on 16 different colors denoted, for example, F11, F12, F13, F14, F21, ..., F44. The part 120 outputs each cell in the form of a string of 28 blocks of bits at 2.6 Gb/s with gaps whose approximate duration is three times the duration of one block, because the bit rate has been multiplied by approximately four.

The part 121 concatenates these blocks and outputs packets of 16 synchronous cells separated by gaps with an approximate duration of three times the duration of a cell at 2.6 Gb/s.

The part 118 comprises:

16 wavelength converters 89'.1 through 89'.16 having 16 inputs respectively connected to the 16 fibers 34.1 through 34.16 to assign 16 different colors to the 16 cells supplied by the modules 33.1 through 33.16; and a combiner 90' having 16 inputs respectively connected to the 16 outputs of the converters 89'.1 through 89'.16 and an output connected to the part 120 by a single optical fiber 119.

The part 120 comprises:
an optical amplifier 91';
a set of 16 delay lines 95', 96', ..., 97' each introducing a time-delay equal to one bit period Tb at 622 Mb/s;
16 three-port couplers 92', 93',..., 94';
a second set of delay lines 105', 106', ..., 107' each introducing a time-delay equal to one bit period T'b at 2.6 Gb/s;
16 three-input couplers 108',..., 109', 110';
16 optical gates 100', 101', ..., 102', 103'; and
a control device 111' controlling in parallel all the optical gates 100' through 103' with a period equal to the duration of 16 bits at 622 Mb/s.

The design of this part 120 is similar to the design of the stage 35a described previously but comprises many fewer components and the transfer from the first register to the second register is 28 times faster. On the other hand, the blocks of 16 bits supplied at the output of the part 120 are separated by gaps in which there is no bit with the result that each cell is no longer a continuous stream of 424 bits.

The function of the part 121 is to re-establish the continuity of the bits in each cell by concatenating the blocks of 16 bits. The part 121 comprises:
a splitter 122;
28 optical gates 123, 123, ..., 126;
a control device 127 electrically controlling the optical gates 123 through 126. independently of each other;
28 fixed delay lines 127, 128, ..., 129, 130 introducing respective time-delays equal to 0, D, 2 .D, 3.D, ..., 25.D, 26.D, 27.D where D is the difference between the durations of a block of 16 bits at 622 Mb/s and at 2.6 Gb/s;
a combiner 131 whose output constitutes the output of the part 121 and of the stage 35;
a control device 132; and
a delay line 133 introducing a time-delay equal to 24.T'b.

The splitter 122 has 28 outputs respectively connected to 28 inputs of the combiner 131 by 28 gates 123 through 126 in series with one of the delay lines 127 through 130.

For each cell the first block must be delayed by 27.D, the second by 26.D, and so on. The control device 132 controls the gates 123 through 126 in succession to pass the first block into the delay line 130, the second block into the delay line 129, and so on. The 28th block is passed directly by the gate 126 to the combiner 131. At the output of the combiner 131 each cell is again in the form of a continuous stream of bits. Each cell has a different one of 16 colors and is at a bit rate of 2.6 Gb/s. The delay line 133 has the same function as the delay line 112 of the stage 35a. At this stage each cell therefore comprises 424 wanted bits plus 24 empty bits.

Spectral multiplexing using 16 colors provides for very efficient use of the stages 33 and 35 but is not suitable for switching in the switching network 5. The function of the stage 37 is to time-division multiplex these cells onto four optical fibers to constitute four 2.6 Gb/s multiplexes with a load of 0.4 Erlang that are not spectrally multiplexed.

Figure 6:
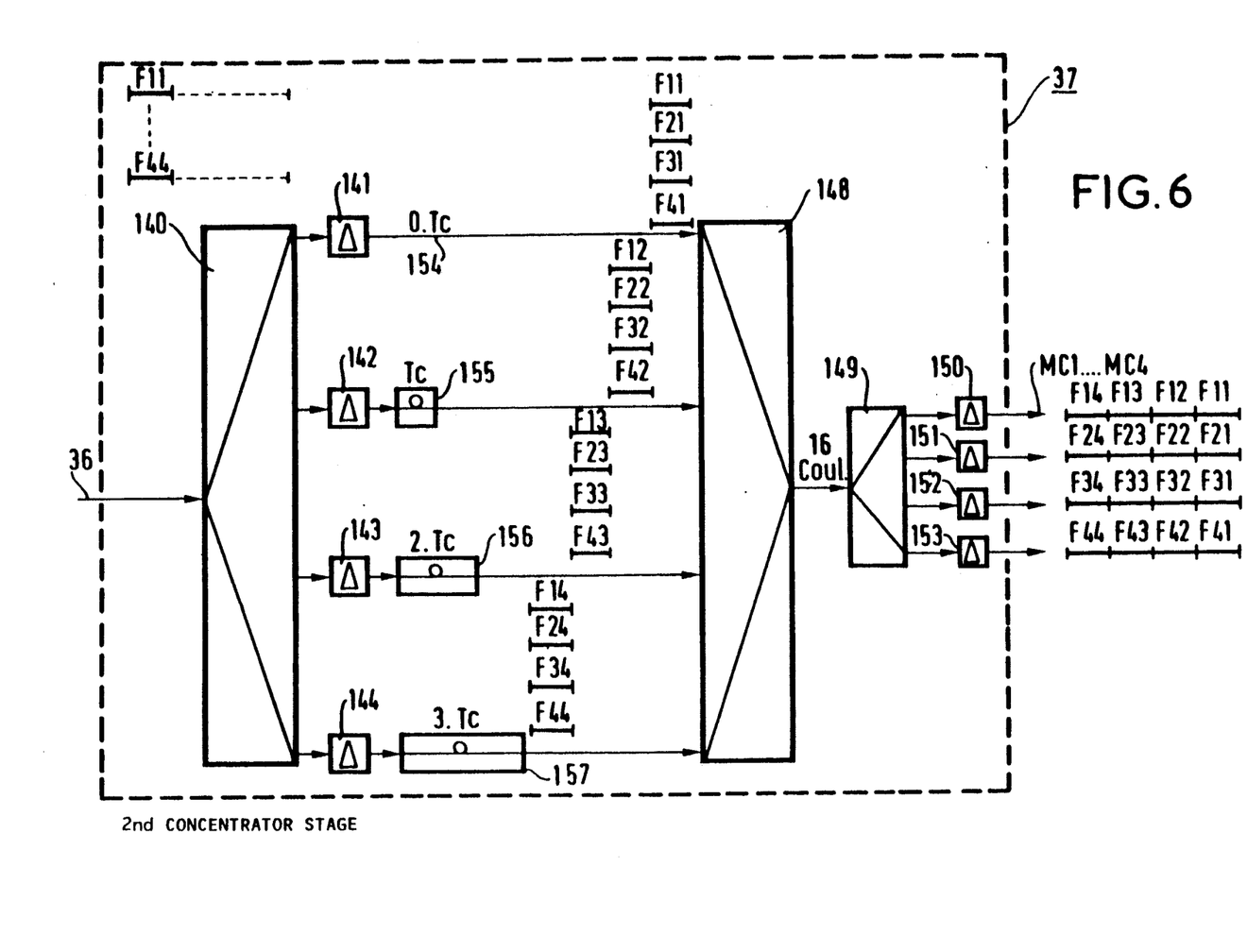
FIG. 6 shows the block diagram of one embodiment of a stage included in the concentrator which effects a second stage of concentration by periodic time-division multiplexing.

FIG. 6 shows the block diagram of one embodiment of the stage 37. It receives from the fiber 34 16 synchronous cells multiplexed using 16 different colors denoted F11, F12, F13, F14, F21, ..., F41, F42, F43, F44. Each packet of 16 cells is followed by a gap whose approximate duration is equal to three cell periods at 2.6 Gb/s.

This embodiment comprises:
a splitter 140;
a periodic filter 141 passing the colors F11, F21, F31, F41;
a periodic filter 142 passing the colors F12, F22, F32, F42;
a periodic filter 143 passing the colors F13, F23, F33, F43;
a periodic filter 144 passing the colors F14, F24, F34, F44;
four delay lines 154 through 157 introducing time-delays equal to 0, Tc, 2. Tc, 3.Tc where Tc is the cell period at 2.6 Gb/s;
a combiner 148;
a splitter 149;
a bandpass filter 150 passing the colors F14, F13, F12, F11;
a bandpass filter 151 passing the colors F24, F23, F22, F21;
a bandpass filter 152 passing the colors F34, F33, F32, F31; and
a bandpass filter 153 passing the colors F44, F43, F42, F41.

The splitter 140 has four outputs respectively connected to four inputs of the combiner 148 by four channels respectively comprising the filter 141, the filter 142 in series with the delay line 155, the filter 143 in series with the delay line 156 and the filter 144 in series with the delay line 157. The output of the combiner 148 is connected to the input of the splitter 149. The splitter 149 has four outputs respectively connected to four outputs of the stage 37 by the respective filters 150 through 153 to provide the multiplexes MC1, ..., MC4.

The four channels which connect the splitter 140 to the combiner 148 shift the cells to form four packets of four synchronous cells. The first channel passes on with no time-delay the cells having the colors F11, F21, F31, F41. The second channel passes on with a time-delay equal to the cell period the cells having the colors F12, F22, F32, F42. The third channel passes on with a time-delay equal to two cell periods the cells having the colors F13, F23, F33, F43. The fourth channel passes on with a time-delay equal to three cell periods the cells having the colors F14, F24, F34, F44.

The cells having the colors F11, F12, F13, F14 having been made successive and contiguous in time, it remains to route them onto a separate multiplex from the cells representing the other 12 colors. The function of the splitter 149 is to split the 16 color cells to the four filters 150 through 153 which divide them between four physically separate multiplexes MC1, ..., MC4 on four optical fibers. The filter 150 passes the four consecutive cells having the colors F14, F13, F12, F11. At the same time, the filter 151 passes the four consecutive cells having the colors F24, F23, F22, F21. At the same time, the filter 152 passes the four consecutive cells having the colors F34, F33, F32, F31. At the same time, the filter 153 passes the four consecutive cells having the colors F44, F43, F42, F41.

At the output of the stage 37 the cells retain their various colors but no longer constitute a spectral multiplex. Each cell can be distinguished by the time slot and the multiplex conveying it.

Figure 7:
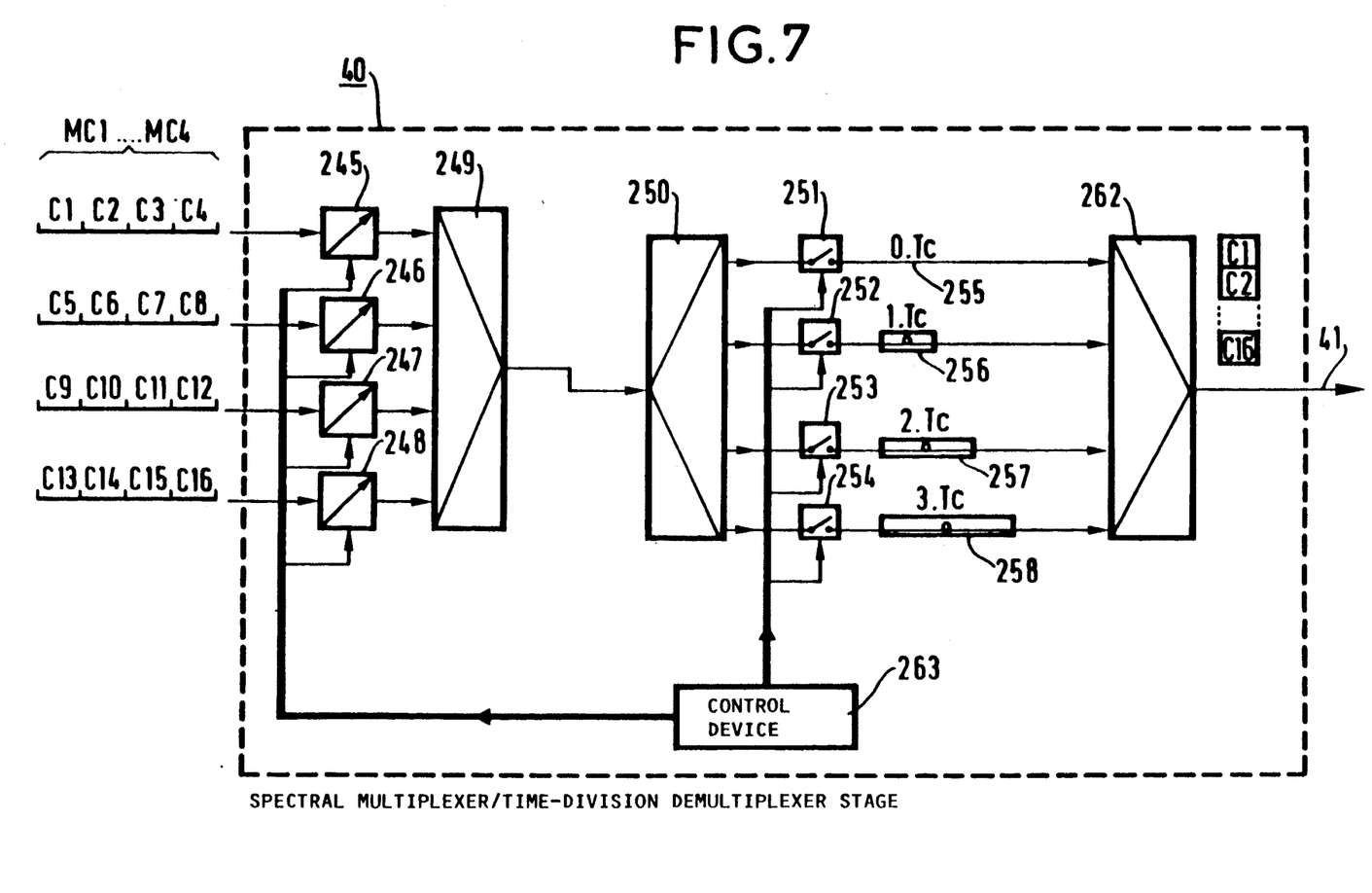
FIG. 7 shows the block diagram of one embodiment of a stage included in the concentrator which effects a first level of deconcentration of the cells from the telecommunication network addressed to the subscriber terminals by periodic time-division demultiplexing and spectral multipexing.

FIG. 7 shows the block diagram of the spectral multiplex and time-division demultiplex stage 40 of the concentrator 2. It receives on the four multiplexes MC1, ..., MC4 cells with any color at a bit rate of 2.6 Gb/s. It outputs on a single optical fiber 41 packets of 16 synchronous cells by spectral multiplexing using 16 different colors at 2.6 Gb/s. Two consecutive packets of 16 cells are separated by a gap whose duration is equal to three cell periods. This stage comprises:

four wavelength converters 245 through 248 having four inputs respectively connected to the four multiplexes MC1, ..., MC4;

a combiner 249 having four inputs respectively connected to four outputs of the converters 245 through 248;

a splitter 250 having an input connected to the output of the combiner 249 and four outputs;

electrically controlled optical gates 251 through 254;

a set of four delay lines 255 through 257 introducing respective time-delays equal to 0, Tc, 2.Tc, 3.Tc where Tc is the cell period at 2.6 Gb/s;

a combiner 262 having four inputs and an output constituting the output of the stage 40 connected to the fiber 41; and a control device 263 controlling each of the gates 251 through 254 independently and controlling each of the converters 245 through 248 independently.

Each output of the splitter 250 is respectively connected to an input of the combiner 262 by a gate 251, ..., 254 and a delay line 255, ..., 258.

Consider time-division demultiplexing:

a packet of four consecutive cells C1, C2, C3, C4 arriving on multiplex MC1;

a packet of four consecutive cells C5, C6, C7, C8 arriving on multiplex MC2;

a packet of four consecutive cells C9, C10, C11, C12 arriving on multiplex MC3; and a packet of four consecutive cells C13, C14, C15, C16 arriving on multiplex MC4;

these four packets arriving simultaneously.

The four cells from each packet are colored in succession by one of the converters 245 through 248 so that 16 different colors are assigned to the cells C1 through C16. The colors are assigned periodically at intervals of four cell periods.

The four cells of each packet are time-delayed by respective amounts equal to 0, Tc, 2. Tc, 3. Tc in order to make them synchronous with each other. To this end each gate 251 and 252 is opened in turn for the duration of a cell and periodically with a period equal to four cell periods Tc. Thus the cells C4, C8, C12, C16, for example, are sent simultaneously by the gate 254 and are delayed simultaneously by the delay line 258 which it introduces a time-delay equal to 3.Tc. They reach the combiner 262 at the same time as the cells C1, C5, C9, C13, for example which are transmitted simultaneously by the gate 251 and which are transmitted with a null time-delay by the line 255.

Figure 8:
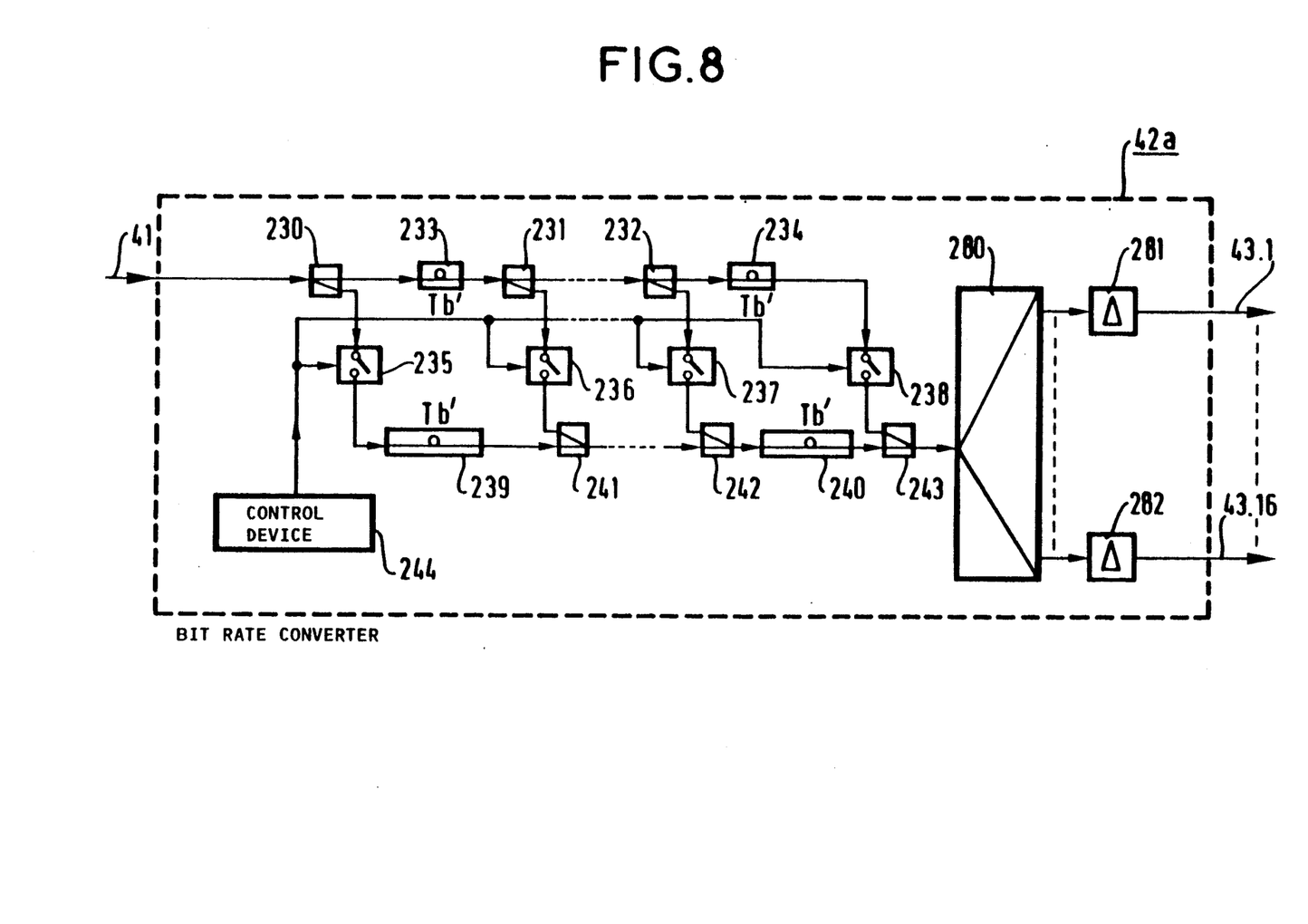
FIGS. 8 and 9 show the block diagrams of two embodiments of a bit rate divider stage included in the concentrator to process cells to subscriber terminals.

FIG. 8 shows the block diagram of a first embodiment 42a of the bit rate converter stage 42 of the concentrator 2. This embodiment operates cell by cell in an analogous manner to the stage 35a shown in FIG. 7 and previously described. It processes 16 cells simultaneously, receiving simultaneously 16 synchronous cells spectrally multiplexed using 16 different colors.

Each cell comprises 424 bits plus 24 routing label bits, or 448 bits in all, at this level of the concentrator 2. The bit rate is therefore 657 Mb/s.

The stage 42a comprises:

a first series of 448 delay lines 233, ..., 234 each introducing a time-delay T'b equal to the bit period at 2.6 Gb/s;

a first series of 448 three-port couplers 230, 231, ..., 232 interleaved into the first series of delay lines on the input side of each of these lines, respectively;

a second series of 448 delay lines 239, ..., 240 each introducing a time-delay equal to Tb', the bit period at 657 Mb/s;

a second series of 448 three-port couplers 241, ..., 242, 243 interleaved into the second series of delay lines at the output of each of these lines;

448 electrically controlled optical gates 235, 236, ..., 237;

a control device 244 having an output controlling simultaneously all the optical gates 235, 236, ..., 237, 238;

a splitter 210 with 16 outputs; and 16 filters 211, ..., 212 respectively tuned to the 16 cell colors having 16 inputs respectively connected to the 16 outputs of the splitter 210 and 16 outputs constituting the 16 outputs of the stage 42a connected to the fibers 43.1, ..., 32.16.

The optical gate 235 connects a third port of the coupler 230 to the input of the display line 239. The optical gate 236 connects a third port of the coupler 231 to the third port of the coupler 241 at the output of the delay line 239, etc. The optical gate 237 connects a third port of the coupler 232 to the third port of the coupler 242 at the input of the delay line 240. The optical gate 238 connects the output of the last delay line 234 of the first series of delay lines to the third port of the coupler 243 at the output of the last delay line 240 of the second series of delay lines. One port of the coupler 230 constitutes the input of the stage 42a and is connected to the optical fiber 41. A port of the coupler 243 is connected to an input of the splitter 280.

The two series of delay lines are used like two shift registers. When a complete cell is stored in the first series of delay lines 233, ..., 234 the control device 244 simultaneously commands all the optical gates 235, 238 to transfer 448 bits simultaneously into the second series of delay lines. The bits arrive at the first series of delay lines 230 through 234 at 2.6 Gb/s and leave the second series of delay lines 239 through 240 at 657 Mb/s as they are separated by a time-delay equal to Tb'. The splitter 210 and the filters 211, ..., 212 spectrally demultiplex each packet of 16 cells onto 16 output optical fibers 43.1 through 43.16.

Figure 9:
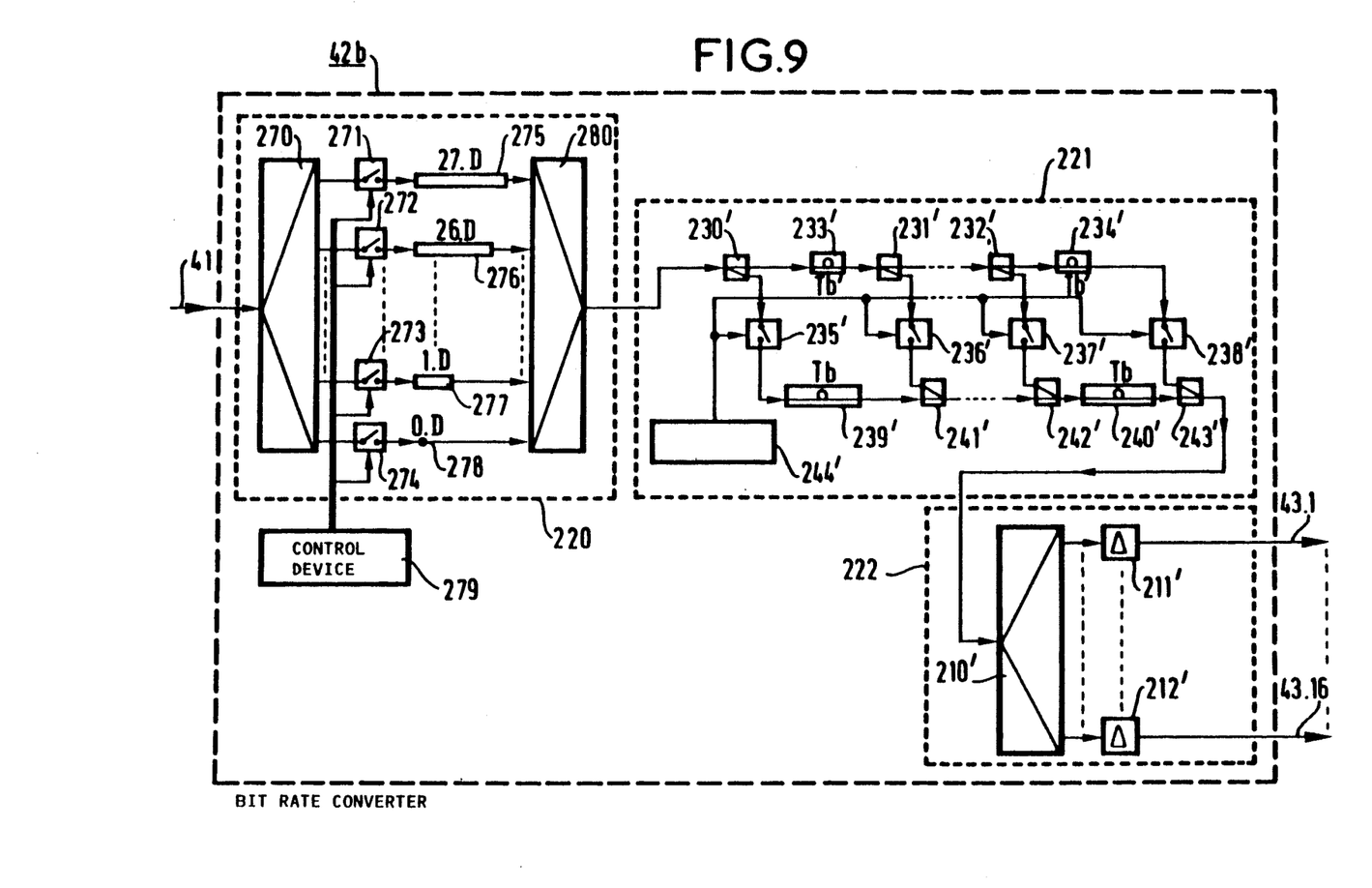

FIG. 9 shows the block diagram of a second embodiment 42b of the bit rate converter stage 42 in the concentrator 2. This second embodiment is an optimized variant of the first embodiment 42a. The two series of 448 delay lines are replaced by two series of 16 delay lines to apply bit rate conversion in blocks of 16 bits rather than cell by cell, with a view to simplifying the implementation. However, the cells must be divided into 28 blocks of 16 bits first. The stage 42b therefore comprises a first part 220 dividing each cell into 28 blocks of 16 bits, a second part 221 carrying out the bit rate conversion block by block and a third part 222 comprising a splitter 280' and 16 filters 281', ..., 282' for spectrally demultiplexing each packet of 16 cells onto 16 output optical fibers 43.1 through 43.16.

The first part 220 comprises:

a splitter 270 having an input connected to the optical fiber 41 supplying cells at 2.6 Gb/s and having 28 outputs;

a combiner 280 having an output constituting the output of the first part 220 which is connected to an input of the second part 221 and 28 inputs;

28 electrically controlled optical gates 271, 272, ..., 273, 274;

27 delay lines 275, ..., 276, 277, 278 introducing time-delays respectively equal to 27.D, 26.D, ..., D, 0 where D is the difference between the duration of a block of 16 bits at 657 Mb/s and its original duration at 2.6 Gb/s; and a control device 279 having outputs respectively connect to control inputs of the optical gates 271, ..., 274.

27 outputs of the splitter 270 are respectively connected to one of the 28 inputs of the combiner 280 by a channel comprising an optical gate in series with a delay line.

The control device 279 successively opens the gates 271, ..., 274 to pass successively the 28 blocks of 16 bits constituting each cell. A first block is passed without any time-delay by the gate 274 and the direct connection. A second block is passed by the gate 273 to be stored and delayed in the delay line 277 introducing a time-delay representing a block of 16 bits. A third block is passed by a gate (not shown) into a delay line (not shown) introducing a time-delay representing two blocks of 16 bits, and so on. The 28th block is passed by the gate 271 to be stored in the delay line 275 for a duration representing 27 blocks of 16 bits. The first part 220 therefore passes blocks of 16 bits to the second part 221 and spaces them by a time-delay representing the duration of 16 bits at 657 Mb/s, so that each block can be processed in the part 221 because the time available is equal to the duration of a block of 16 bits.

The design of the part 221 is similar to that of the first embodiment 42a described previously and shown in FIG. 14 except that the number of delay lines of the first series 223', ..., 234', the number of couplers 230', ..., 232', interleaved into the first series of delay lines, the number of optical gates 235', ..., 238', the number of delay lines of the second series 239', ..., 240' and the number of couplers 241', ..., 243' interleaved into the second series of delay lines is equal to 16 instead of 448 in each case. Consequently this bit rate converter stage 42b is much easier to implement than that of the stage 42a previously described.

The splitter 210' and the converters 211', ..., 212' have the same functions as the components with the same reference numbers in the embodiment 42a.

Figure 10:
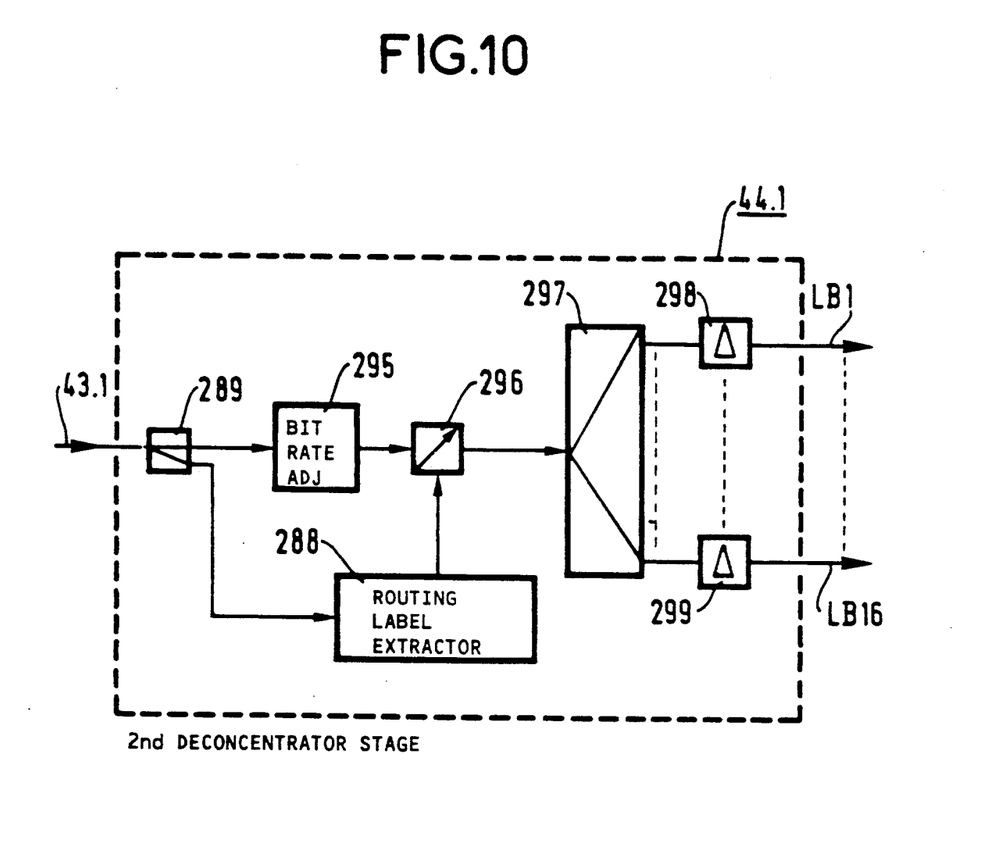
FIG. 10 shows the block diagram of one embodiment of a stage included in the concentrator which effects a second degree of deconcentration by spectral demultiplexing of cells addressed to subscriber terminals and which also carries out bit rate adjustment.

FIG. 10 shows the block diagram of one embodiment of a module 44.1 of the stage 44 which provides a second stage of deconcentration by spectral demultiplexing and bit rate adjustment. It comprises:

a three-port coupler 289;

a bit rate adjuster device 295 which eliminates the three routing label bytes and changes the bit rate from 657 Mb/s to 622 Mb/s to re-establish the continuity of the bits following elimination of the routing header;

a wavelength converter 296 having an electrically controlled input;

a 16-output splitter 297;

16 filters 298, ..., 299 respectively passing 16 fixed wavelengths and having outputs which constitute the 16 outputs of the module 293 connected to the lines LB1, ..., LB16; and a routing label extractor device 288.

The coupler 289 has three ports: a first port constitutes the input of the module 44.1, a second port is connected to an input of the bit rate adjuster device 295 and a third port is connected to an input of the routing label extractor device 288. This is a conventional design and its function is to control the wavelength converter 296 by supplying to it an electrical signal which selects a color so as to impart to a cell a color representing the content of its routing label. The output of the device 295 is connected to the input of the wavelength converter 296. The output of the latter is connected to the input of the splitter 297. The 16 outputs of the splitter 297 are respectively connected to the inputs of the 16 filters 298, ..., 299. The filter representing the wavelength of a cell passes that cell to a subscriber terminal.

The bit rate adjuster device 295 will not be described in detail. Its design is similar to that of the part 120 of the stage 35b described previously and shown in FIG. 9. The man skilled in the art will know how to adapt this design to effect a change of bit rate from 657 Mb/s to 622 Mb/s.

What is claimed is:

1. A photonic concentrator for connecting, to a telecommunication network, subscriber terminals sending and receiving data in the form of fixed length cells using asynchronous time-division multiplexing, said concentrator comprising:

first means for time-division multiplexing and spectral multiplexing cells from subscriber terminals to provide a first means output; and second means receiving the output from said first means and resynchronizing cells of said first means output to a local clock by delaying each cell of said first means output, with a variable delay.

2. A photonic concentrator for connecting, to a telecommunication network, subscriber terminals sending and receiving data in the form of fixed length cells using asynchronous time-division multiplexing, said concentrator comprising:

first means for time-division multiplexing and spectral multiplexing cells from subscriber terminals to provide a first means output; and second means receiving the output from said first means and resynchronizing cells of said first means output to a local clock, wherein to process cells from subscriber terminals said concentrator further comprises:

third means for spectrally multiplexing the resynchronized cells and for multiplying their bit rate; and fourth means for time-division multiplexing, without spectral multiplexing, cells output by the third means.

3. A photonic concentrator for connecting, to a telecommunication network, subscriber terminals sending and receiving data in the form of fixed length cells using asynchronous time-division multiplexing, said concentrator comprising:

first means for time-division multiplexing and spectral multiplexing cells from subscriber terminals to provide a first means output; and second means receiving the output from said first means and resynchronizing cells of said first means output to a local clock;

third means for time-division demultiplexing and spectrally multiplexing cells addressed to subscriber terminals, to provide a third means output;

fourth means receiving the output of said third means and dividing the bit rate of the time-division demultiplexed and spectrally multiplexed cells of said third means output; and fifth means receiving the output of said fourth means and spectrally demultiplexing cells whose bit rate has been divided.

4. A photonic concentrator according to claim 3, wherein said third means operate periodically on cells supplied to said concentrator in a sorted order by said telecommunication network.

* * * * *